United States Patent
Takahashi et al.

[11] Patent Number: 6,145,459
[45] Date of Patent: Nov. 14, 2000

[54] FRICTION-REDUCING SHIP AND METHOD FOR REDUCING SKIN FRICTION

[75] Inventors: Yoshiaki Takahashi, Tokyo; Yuki Yoshida, Kawasaki, both of Japan

[73] Assignee: Ishikawajima-Harima Heavy Industries Co., Ltd., Tokyo, Japan

[21] Appl. No.: 09/113,876

[22] Filed: Jul. 10, 1998

[30] Foreign Application Priority Data

Dec. 19, 1997 [JP] Japan ................................. 9-351756
Feb. 13, 1998 [JP] Japan ................................. 10-046354

[51] Int. Cl.⁷ ........................................................ B63B 1/38
[52] U.S. Cl. ...................................................... 114/67 A
[58] Field of Search ........................... 114/67 R, 67 A, 114/74 A, 74 R

[56] References Cited

U.S. PATENT DOCUMENTS

| | | | |
|---|---|---|---|
| 1,697,257 | 1/1929 | Anissimoff | 114/67 A |
| 2,145,463 | 1/1939 | Spinanger | 114/67 A |
| 2,954,750 | 10/1960 | Crump et al. | 114/67 A |
| 3,938,457 | 2/1976 | Dwyer | 114/74 R |
| 5,575,232 | 11/1996 | Kato et al. | 114/67 A |

FOREIGN PATENT DOCUMENTS

| | | | |
|---|---|---|---|
| 50-83992 | 11/1973 | Japan . | |
| 53-136289 | 11/1978 | Japan . | |
| 60-139586 | 7/1985 | Japan | 114/67 A |
| 60-163784 | 8/1985 | Japan | 114/67 A |
| 61-41685 | 2/1986 | Japan | 114/67 A |
| 61-071290 | 3/1986 | Japan . | |
| 61-39691 | 3/1986 | Japan . | |
| 61-128185 | 11/1986 | Japan . | |

*Primary Examiner*—Sherman Basinger
*Attorney, Agent, or Firm*—Pearne & Gordon LLP

[57] ABSTRACT

A method for reducing skin-friction is based on generating bubbles by blowing gas into water from a selected location of a moving ship which are separated along the longitudinal direction by specific distances.

3 Claims, 6 Drawing Sheets

FRICTION-REDUCING SHIP AND METHOD FOR REDUCING SKIN FRICTION

BACKGROUND OF THE INVENTION

1. Field of the Invention

The present invention relates in general to friction-reducing ships and methods for reducing skin-friction, and relates in particular to a technology for reducing skin-friction by blowing micro-bubbles from the hull into water.

2. Description of the Related Art

Technologies for reducing skin-friction in ships are disclosed in a number of Japanese Patent Applications, First Publications, S50-83992, S53-136289, S60-139586 and S61-71290 and in Practical Utility Model Applications, S61-39691, S61-128185, for example. These technologies are based on reducing skin-friction of a ship by blowing gas from the hull surface into water to introduce numerous bubbles in an interface between hull and water to reduce the skin-friction between the ship and water.

In such technologies, it is known that, to increase the friction reduction effects created by the bubbles, the volume of gas blowing into the water should be increased to raise the average void fraction $\alpha_m$ (concentration of micro-bubbles) in the turbulent boundary layer formed on the hull surfaces, but it is found that higher gas flow rates cause micro-bubbles to be pushed out of the turbulent boundary layer, resulting in no increase in the average void fraction $\alpha_m$ within the boundary layer.

A practical method that can be applied to a friction-reducing ship is to produce bubbles by blowing compressed air generated by on-board compressors to produce a desired void fraction in a boundary layer at the bottom section of a ship.

However, because of a high static pressure at the bottom section of a ship, such technologies are highly energy-consuming, and the energy required to generate micro-bubbles exceeds the energy saving resulting from reducing the skin-friction, and adaptation of bottom-bubbles technology to practical situations becomes problematic.

Through a series of investigations into skin-friction effects in ships, the present inventors have discovered that friction-reducing ships can be made practical, if jetting nozzles are located in low static pressure regions and the bubbly flow fields created at the bottom and hull surfaces of the ship can be made to flow along the hull surfaces. Based on such a premise, the present inventors developed a computational model in which the bubbles are generated in low static pressure regions, and given the shape of a hull structure, the model is able to compute void fractions in any locations about the hull structure by considering the turbulent diffusion of micro-bubbles along the flow lines near the hull surfaces.

According to the computational equations, developed using turbulence coefficients in assumed isotropic diffusion fields, the effects of turbulent diffusion are considered by varying the flow speeds in X-, Y- and Z-directions (levitation direction) so as to create turbulence in the traces of micro-bubbles flowing about the hull surfaces. In other words, random activities of the bubbles are simulated directly by using Monte Carlo methods. When the activities of the micro-bubbles are so determined, a void fraction at a given point in time can be obtained by dividing the volume of the micro-bubbles existing in a given volume of an inspection volume (cell volume) by the volume of the cell. Based on the distribution patterns of the void fraction thus obtained, optimum configuration of the gas jetting devices, located at the bow of a ship where maximum friction reduction effects are expected, can be determined in relation to the flow lines originating in those locations and spreading along the hull surfaces towards the stern of the ship.

The bubbles ejected from the bow of the ship into the boundary layer are carried along with the flow lines in such a way that those bubbles in the leading regions of the bottom section will flow along the bottom surface, but those bubbles in the latter regions of the ship will tend to flow along the lateral surfaces of the ship. The ultimate result is that the bubbles are able to blanket the entire submerged surfaces of the moving ship to provide effective friction reduction. The micro-bubbles blanketing the hull surfaces can contribute more effectively to friction reduction if they can cling to the hull surfaces.

However, although those bubbles which are carried to the bottom section dwell near the bottom surface, for a time, and cling to the bottom surface, those lateral bubbles which are flowing along the lateral hull of the ship cannot effectively redirect the lift force inherent in the bubbles themselves to the clinging direction. This means that there is little force being exerted on those lateral bubbles to keep them near the hull surfaces. In other words, for a general shape of a ship represented typically by a tanker which has the side hull plates attached at roughly right angles to the bottom plate, the lateral bubbles do not generate a force to keep the bubbles close to the surface. Therefore, it is considered by the present inventors that the friction reduction effects can be further improved if the bubbles can be subjected to a lateral force to keep the bubbles clinging to the hull surfaces.

Furthermore, for the bottom bubbles, the larger the bubble diameter the greater the floating force to keep themselves clinging to the bottom surface, and the average void fraction in the boundary layer is higher and the greater friction reduction effects are produced. However, for the lateral bubbles, the force to keep the bubbles close to the hull surface is only the lift force (Saffman's lift) derived from a difference between the shear flow speed and the bubble flow speed. The magnitude of this lift force is relatively small and the bubbles are quickly carried away from the hull surface. This behavior of the lateral bubbles means that they cannot contribute effectively to reducing the skin-friction, because, a boundary layer is generally formed thin near the bow and becomes thicken towards the stern of a ship, therefore, if the gas flow rate through the gas jetting device is adjusted to maximize bubble retention in a thick boundary layer, the bubbles are blown out of the boundary layer from a thinner boundary layer. Therefore, it is critical to control bubble generation conditions so as to retain the bubbles within the boundary layer under all operating conditions of the ship to maximize the friction reduction effects of the micro-bubbles.

SUMMARY OF THE INVENTION

In view of the existing state-of-the-art of reducing skin friction in ships, the present invention aims to provide a technology to enable the following broad technical objectives:

a. To effectively reduce skin-friction while minimizing the volume of gas required to be blown into the water; and b. To retain micro-bubbles within the turbulent boundary layer.

The objectives have been achieved in a method for reducing skin-friction in a ship by blowing gas from a moving ship into water to generate bubbles on submerged surfaces in such a way that bubbles are generated at locations separated at specific distances along a longitudinal direction.

Also, a friction-reducing ship based on the method which reduces skin-friction by jetting air from a moving ship into water to form bubbles on submerged hull surfaces, is comprised by: a plurality of gas jetting devices for jetting gas into water disposed at specific distances along a longitudinal direction; and a gas supply facility for supplying gas to the gas jetting devices.

Accordingly, the method is applied effectively to a friction-reducing ship so that the bubbles produced by succeeding jetting devices become enclosed by the bubbles produced by preceding jetting devices in the longitudinal direction or moving direction of the ship. The bubbles are thus prevented from flowing away from the turbulent boundary layer, enabling more of the bubbles to be trapped and distributed within the turbulent boundary layer, thereby raising the void fraction and reducing skin-friction using a relatively small amount of the jetting gas.

The objectives are achieved through a technique developed in the present invention to force the lateral bubbles towards the side hull plates of the ship to further enhance the skin-friction reduction effects in a ship.

The technique is applied to a friction-reducing ship for reducing skin-friction by generating bubbles by blowing compressed air into water, at submerged lateral locations where flow lines lead to a bottom section or lateral hull sections, in a bow section of a moving ship, wherein those side hull plates disposed in a longitudinal mid-section of the ship are slanted outwards at an angle to a plane vertical to the bottom section. Because the side hull plates are angled outward, the lift force for the lateral bubbles is subjected to a lateral force to push the bubbles towards the hull surface, and the blanketing action of the lateral bubbles is further enhanced to lead to effective friction reduction.

The objectives are achieved through another technique developed in the present invention to increase the dwell time of the bubbles directed into the boundary layer.

This is a method for reducing skin-friction of a moving ship by blowing compressed air from a ship into water to generate bubbles to be injected into a boundary layer to produce a blanket of bubbles to cover submerged surfaces of the ship, wherein the compressed air is ejected at a jetting speed higher than a ship speed at an angle to the submerged lateral surfaces towards a stern section, in such a way that diameters of lateral bubbles are smaller than those of bottom bubbles.

In such a friction-reducing ship, those bubbles elected at an angle towards the stern at a speed faster than the ship speed are carried faster towards the stern in the boundary layer. The difference between the shear speed of the boundary flow fields and the inner and outer relative speeds of a bubble is larger at the outer periphery of the bubble so that a lift force of the bubbles is affected in such a way to force the bubbles towards the inner side, i.e., towards the hull surface. Also, because the lateral bubbles are made smaller than the bottom bubbles, their effect on lift force is relatively small. Therefore, the dwell time for the lateral bubbles is made longer, thus enabling to increase the average void fraction in the boundary layer on the lateral section, and increasing the friction-reducing effects.

DESCRIPTION OF THE PREFERRED EMBODIMENTS

A: First Embodiment

In the following, preferred embodiments will be presented with reference to FIGS. 1~4 for the first embodiment. This embodiment relates to an application of the present invention to a tanker vessel which is characterized by a relatively flat bottom section.

Figure 1:
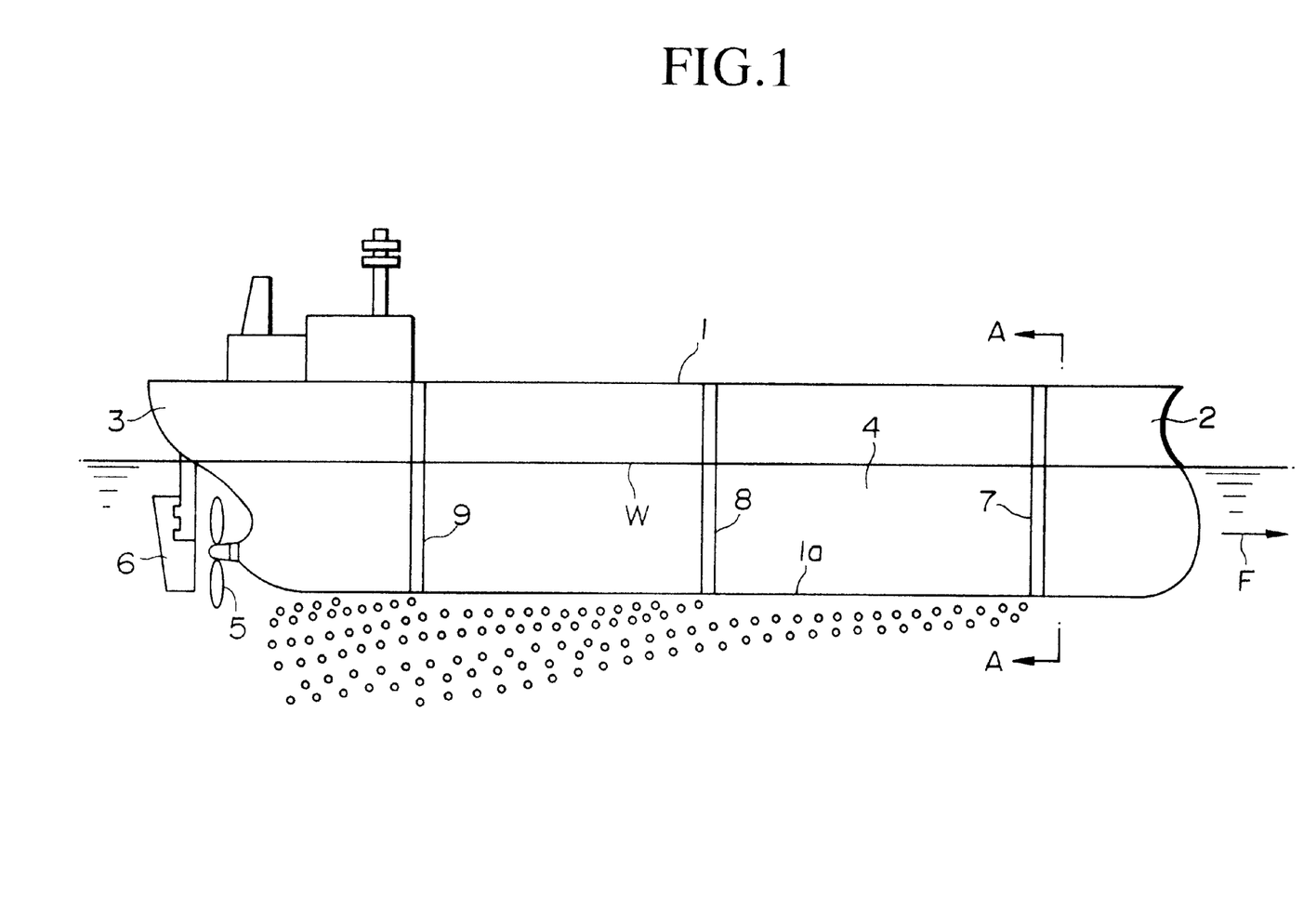
FIG. 1 is an external side view of a friction-reducing ship of a first embodiment.

FIG. 1 shows a ship 1, the bow 2, the stern 3, submerged surfaces 4, a screw 5, a rudder 6, gas jetting devices 7~9, the ship movement direction F, and the waterline W. The ship 1 is provided with a plurality of bubble generation sections (three sections in this case) which are separated at certain distances in the longitudinal direction (from the bow 2 to the stern 3) and provided with the gas jetting device 7~9.

Figure 2:
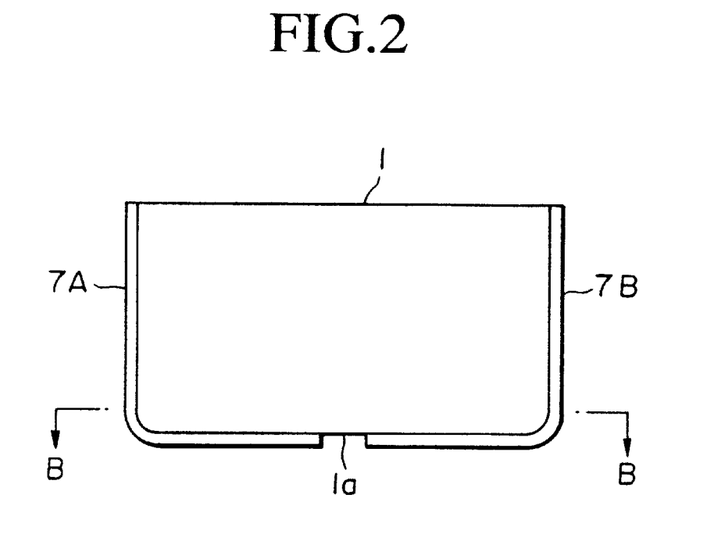
FIG. 2 is a cross sectional front view through a plane A—A in FIG. 1.
Figure 3:
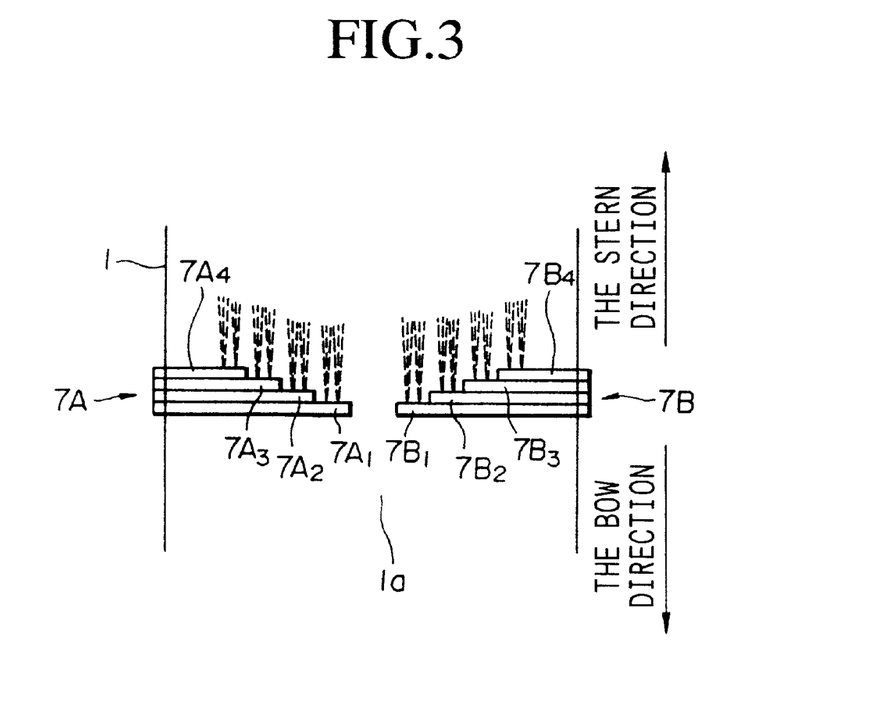
FIG. 3 is a cross sectional plain view through a plane B—B in FIG. 2.

As shown in FIGS. 2 and 3, the gas jetting device 7 is comprised by a piping path 7A extending from the starboard side to the flat plate bottom section 1a on the hull surfaces of the ship 1, and a piping path 7B extending from the port side to the flat plate bottom section 1a on the hull surfaces of the ship 1. These piping paths 7A, 7B are attached in a wrap around manner to the exterior plate of the ship 1, in this case, and are made as flat as possible so as not to protrude out of the ship 1 to increase the skin-friction.

As seen in FIG. 3, the piping path 7A is comprised by a plurality of pipes 7A1~7A4 (four lines), arranged in such a way that, for those pipes which are closer to the stern end of the ship 1, the terminal ends are displaced closer to the lateral hull surfaces. The piping path 7B is constructed in a similar way so that a plurality of pipes 7B1~7B4 (four lines), are arranged in such a way that, for those pipes which are closer to the stern end of the ship 1, the terminal ends are displaced closer to the lateral hull surfaces. The terminal ends of the pipes 7A1~7A4 atid 7B1~7B4 are provided with numerous holes for jetting out air (gas) into water (towards the stern direction) on the stern-side of the terminal ends. The gas jetting devices 8, 9 are constructed in exactly the same manner.

Figure 4:
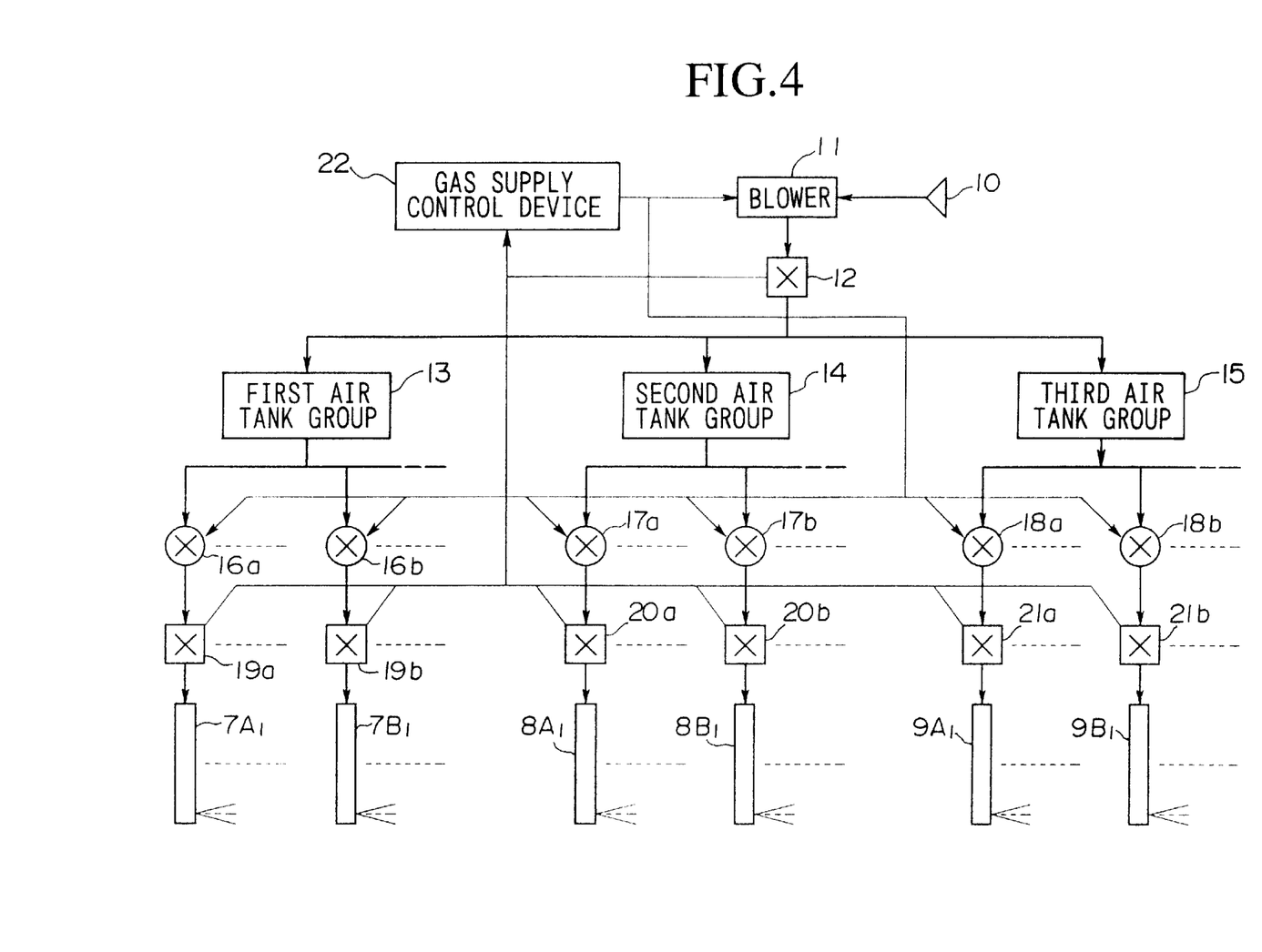
FIG. 4 is a schematic diagram of the gas flow control configuration in the first embodiment.

Gas control system for controlling the supply of air to the gas jetting devices 7~9 will be explained with reference to FIG. 4. FIG. 4 shows a gas supply facility comprised by: an air intake opening 10; a blower 11; a master flowmeter 12; a first air tank group 13; a second air tank group 14; a third air tanks group 15; control valves 16a, 16b, 17a, 17b, 18a and 18b; dedicated flowmeters 19a, 19b, 20a, 20b, 21a, and 21b; a gas supply control device 22. The pipes 7A1~7A4 and 7B1~7B4 have already been explained above, but pipes 8A1~8B1 are for use in the gas jetting device 8, and pipes 9A1~, 9B1~ are for use in the gas jetting device 9.

The gas control system operates as follows. The air intake opening 10, which may be disposed on the deck or other suitable, receives outdoor air and delivers it to the blower 11. The blower 11 delivers outdoor air received from the air intake opening 10 to the first, second and third air tank groups 13, 14 and 15 through the master flowmeter 12. The master flowmeter 12 measures flow rate of air delivered from the blower 11 and outputs it to the gas supply control device 22.

The first air tank group 13 is for use with the gas jetting device 7, and stores the air sent from the blower 11 under compression. The second air tank group 14 is for use with the gas jetting device 8, and stores the air sent from the blower 11 under compression. The third air tank group 15 is for use with the gas jetting device 9, and stores the air sent from the blower 11 under compression.

The control valve 16a operates under the control of the gas supply control device 22, and is used to adjust flow rates of air sent from the first air tank group 13 to be supplied through the dedicated flowmeter 19a to the pipe 7A1 of the gas jetting device 7. The control valve 16b operates also under the control of gas supply control device 22, and is used to adjust flow rates of air sent from the first air tank group 13 to be supplied through a dedicated flowmeter 19b to the pipe 7B1 of the gas jetting device 7.

The control valve 17a operates under the control of the gas supply control device 22, and is used to adjust flow rates of air sent from the second air tank group 14 to be supplied through the dedicated flowmeter 20a to the pipe 8A1 of the gas jetting device 8. The control valve 17b operates also under the control of the gas supply control device 22, and is used to adjust flow rates of air sent from the second air tank group 14 to be supplied through the dedicated flowmeter 20b to the pipe 8B1 of the gas jetting device 8.

The control valve 18a operates under the control of the gas supply control device 22, and is used to adjust flow rates of air sent from the third air tank group 15 to be supplied through the dedicated flowmeter 21a to the pipe 9A1 of the gas jetting device 9. The control valve 18b operates also under the control of the gas supply control device 22, and is used to adjust flow rates of air sent from the third air tank group 15 to be supplied through the dedicated flowmeter 21b to the pipe 9B1 of the gas jetting device 9.

The dedicated flowmeter 19a measures flow rates of air to be supplied to the pipe 7A1, and outputs the air to the gas supply control device 22. The dedicated flowmeter 19b measures flow rates of air to be supplied to the pipe 7B1, and outputs the air to the gas supply control device 22. The dedicated flowmeter 20a measures flow rates of air to be supplied to the pipe 8A1, and outputs the air to the gas supply control device 22. The dedicated flowmeter 20b measures flow rates of air to be supplied to the pipe 8B1, and outputs the air to the gas supply control device 22. The dedicated flowmeter 21a measures flow rates of air to be supplied to the pipe 9A1, and outputs the air to the gas supply control device 22. The dedicated flowmeter 21b measures flow rates of air to be supplied to the pipe 9B1, and outputs the air to the gas supply control device 22.

Although not shown in the drawing, the other set of pipes 7A2~7A4, 7B2~7B4 comprising the gas jetting device 7 are provided similarly with dedicated control valves and flowmeters. Similarly, for the pipes (8A2~8A4, 8B2~8B4 comprising the gas jetting device 8 and the pipes 9A2~9A4, 9B2~9B4 (comprising the gas jetting device 9 are provided with dedicated control valves and flowmeters.

The gas supply control device 22 operates under the guidance of the command device (not shown) located in the steering room, and adjusts the flow rates of air to be supplied to the pipes 7A1~7A4, 7B1~7B4, 8A1~8A4, 8B1~8B4, 9A1~9A4 and 9B1~9B4 by controlling the individual control valves 19a~, 19b~, 20a~, 20b~, 21a~, and 21b~ so as to satisfy the target flow rates specified by the command device and the gas flow rates being measured through the master flowmeters 12 and the dedicated flowmeters 16a~, 16b~, 17a~, 17b~, 18a~ and 18b~.

The friction-reducing ship is operated as follows. When the ship reaches a cruising speed, a command is issued to begin operation of the gas supply control device 22, which turns on the blower 11 and begins sending air to the first, second and third air tank groups 13, 14 and 15. When the gas supply control device 22 decides, based on the reading of the master flowmeter 12, that all the air tank groups 13, 14 and 15 have been supplied with a required amount of air, the control valves 19a~, 19b~, 20a~, 20b~, 21a~ and 21b~ are opened to supply air to the pipes 7A1~7A4, 7B1~7B4, 8A1~8A4, 8B1~8B4, 9A1~9A4 and 9B1~9B4.

The result is simultaneous jetting of air from the numerous holes provided on the terminal ends of all the pipes 7A1~7A4, 7B1~7B4, 8A1~8A4, 8B1~8B4, 9A1~9A4 and 9B1~9B4, thereby generating a bubbly layer blanketing the surface of the bottom section 1a. Micro-bubbles generated near the stern-side of the gas jetting devices 7~9 gradually diffuse towards the stern (opposite to the ship movement direction F) of the ship along the surface of the bottom section 1a. Micro-bubbles are acted upon by the lift forces, and diffuse along the entire bottom surface towards the stern of the ship, as illustrated in FIG. 1.

Because there are three sections of the gas jetting devices 7~9 provided in this embodiment, at certain separations along the bottom surface from the bow to the stern, those micro-bubbles generated in the succeeding gas jetting device 8, are enclosed by the diffusing micro-bubbles generated by the preceding gas jetting device 7. Therefore, the micro-bubbles generated in the gas jetting device 9 are prevented from drifting away from the turbulent boundary layer formed on the surface of the bottom section 1a, and become contained within the turbulent boundary layer.

In the same manner, those micro-bubbles generated in the succeeding gas jetting device 8 (with respect to the preceding gas jetting device 7) are enclosed by the micro-bubbles generated by the gas jetting device 7 and diffusing towards the stern of the ship. Therefore, those micro-bubbles generated by the gas jetting device 8 are also prevented from drifting away from the turbulent boundary layer formed on the surface of the bottom section 1a, and become contained within the turbulent boundary layer.

Accordingly, the micro-bubbles generated in the successive gas jetting devices 7~9 are contained within the entire turbulent boundary layer formed over the surface of the bottom section 1a, thereby providing an effective means for reducing skin-friction for a ship 1 having a bottom section 1a which is flat over an extended area, while conserving the volume of gas supplied to the gas jetting devices 7~9.

The first embodiment utilizes a characteristic that, in a flat-bottomed ship, micro-bubbles are less likely to escape from the hull surface, and micro-bubbles are provided only in the turbulent boundary layer associated with the bottom section 1a of the ship 1. Considering a balance between an energy saved due to friction reduction and an energy consumed by operating the gas supply facility, if a ship 1 has a relatively wide area of flat bottom section 1a, an approach of jetting air only on the bottom section 1a is considered to be more economical.

Also, because the gas jetting devices 7~9 comprised by pipes are wrapped around the outer plate of the ship 1, the embodied technique can be easily applied to ships that do not currently have gas jetting devices. Also, the gas jetting devices 7~9 are attached in such a way that one set of pipes are installed from the starboard side towards the flat plate of the bottom section 1a while the other set of pipes are installed from the port side towards the bottom section 1a. Therefore, compared to a case of continuous pipes wrapped around the hull from the starboard to the port side, the length of the piping path can be made shorter, and enables to lower the energy consumption for driving the gas supply facility.

The present invention is not limited to the embodiment presented above, and the following variations can be included.

a. In the above embodiment, the present technique was applied to a tanker vessel, but the present invention is not limited to a vessel of that type. The technique is applicable to non-flat bottom ships or those ships that have a relatively small area ratio of flat bottom to lateral hull.

b. The number of gas jetting devices and the number of pipes constituting the jetting devices are chosen to suit the characteristics of the ship such as its size. For example, if a ship under consideration is longer than the embodied ship, the number of gas jetting device may be increased. Also, if the girth of the bottom section is wider (i.e., bottom section area is larger), the number of pipes may be increased further so as to ensure that micro-bubbles may be introduced over the entire bottom surface.

c. In the above embodiment, the pipes 7A1~7A4, 7B1~7B4, 8A1~8A4, 8B1~8B4, 9A1~9A4 and 9B1~9B4 are at right angles to the ship movement direction F, but the present invention is not limited to such a configuration. Depending on the shape of the ship 1, the water flow directions along the bottom section are different in different sections of the ship, such as near the bow, middle or the stern of the ship. Therefore, the direction of jetting the bubbles may be varied by considering the flow patterns along the bottom section so that micro-bubbles can be distributed over a wider range of turbulent boundary layer along the bottom section.

d. Regarding the construction of the gas jetting devices 7~9, other constructions may include an arrangement in which the first piping paths 7A, 7B, the second piping paths 8A, 8B and the third piping paths 9A, 9B are made, respectively, of one pipe, and jet holes may be provided in the regions of the pipe to correspond to the bottom section 1a.

e. In the above embodiment, micro-bubbles are made to jet into the turbulent boundary layer of only the bottom section 1a, but the micro-bubbles may be jetted out from all the submerged surfaces 4 of both lateral hull sections.

Features of the first embodiment are summarized as follows.

a. Micro-bubbles for reducing skin-friction of a ship are generated by blowing gas from gas jetting devices disposed at certain distances of separation along the longitudinal direction of the ship, therefore, micro-bubbles are contained effectively within the turbulent boundary layer. Therefore, friction reduction effects can be achieved effectively while conserving the amount of gas required for bubble formation.

b. When the technique is to be applied to a flat-bottomed ship, bubble jetting can be provided on the bottom section only, therefore, energy loss due to skin friction can be greatly reduced while conserving the energy required to operate the gas supply facility.

c. The required separation distances of the gas jetting devices are achieved by wrapping pipes around the hull of the ship at suitable distances so that the present technique is readily applicable to those ships that are not currently equipped with friction-reducing arrangements.

d. The pipes are wrapped around the hull so that one set of pipes are installed from the starboard side towards the bottom section while the other set of pipes are installed from the port side towards the bottom section. Therefore, overall length of the pipes is reduced, thus enabling to control energy consumption by the gas supply facility. Therefore, energy conservation which is the ultimate objective of any friction-reducing ship can be quite effectively achieved by the present technique.

B. Second Embodiment

A second embodiment will be presented in the following with reference to FIGS. 5A~5D, 6A and 6B.

Figure 5A:
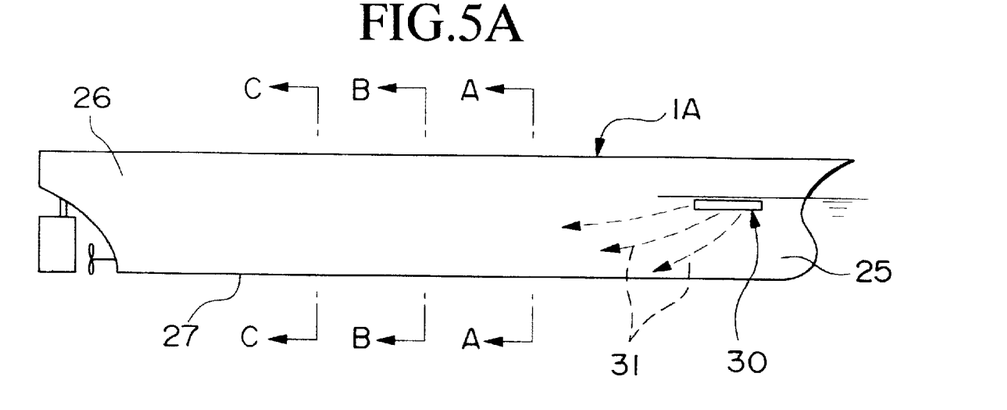
FIG. 5A is a side view of a friction-reducing ship of a second embodiment.
Figure 5B:
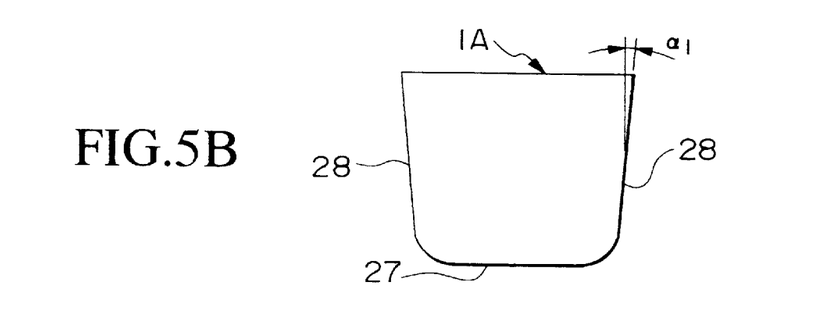
FIG. 5B is a cross sectional view through a plane A—A in FIG. 5A.
Figure 5C:
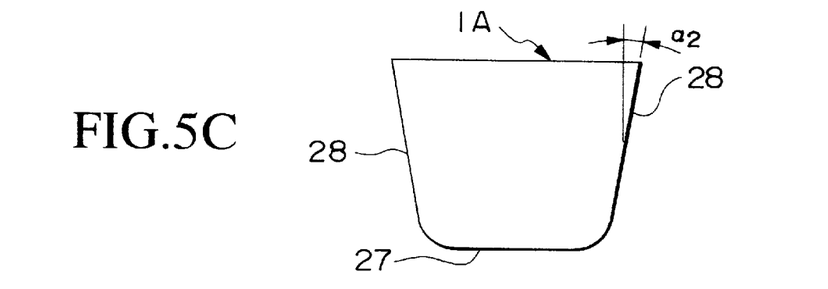
FIG. 5C is a cross sectional view through a plane B—B in FIG. 5A.
Figure 5D:
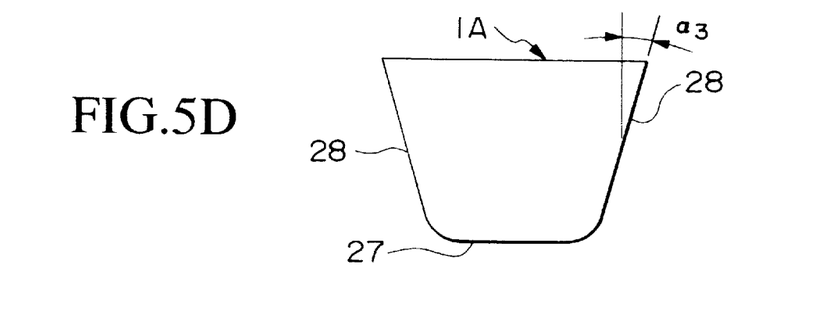
FIG. 5D is a cross sectional view through a plane C—C in FIG. 5A.

Ship 1A includes: the bow section 25; the stern section 26; the bottom section 27; side hull plates 28; and a plurality of gas jetting devices 30 for jetting compressed air. Micro-bubbles 31 are produced by the air blown through the gas jetting devices 30.

As shown in FIGS. 5A~5D, the side hull plates 28 used to build the lateral surfaces in the mid-ship section are slanted outwards at a suitable angle with respect to a plane vertical to the bottom section 27. The slanting angle is optimized in terms of the usage of the ship, ease of manufacturing and friction reduction effects, and is designed so that the angle increases gradually from the bow section 25 towards the stern section 26 (see ($\alpha$1, $\alpha$2 and $\alpha$3).

This design of the slanting angle has an effect of retaining the bubbles 31 swept into the bottom section 27 by the cruising ship at the surface of the bottom section because of the lift forces inherent in the bubbles, and the bottom section become covered effectively with a bubbly sheet.

Figure 6A:
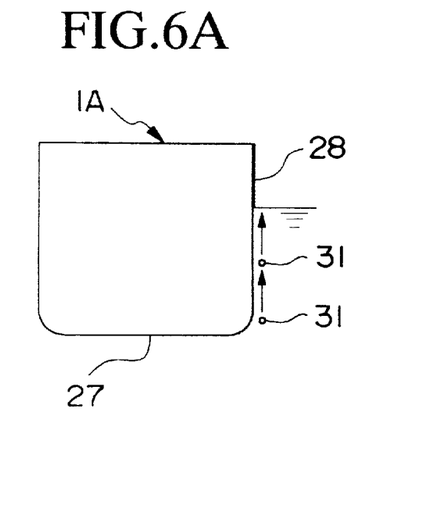
FIG. 6A is a first schematic illustration of the movement of the micro-bubbles in the second embodiment.
Figure 6B:
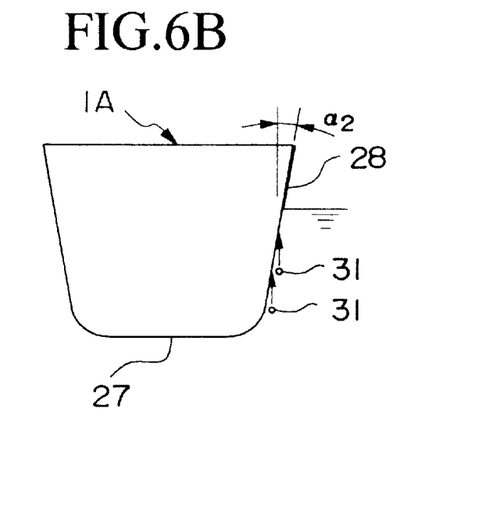
FIG. 6B is a second schematic illustration of the movement of the micro-bubbles in the second embodiment.

In the meantime, those lateral bubbles 31 flowing along the lateral surfaces are also held close to the surface of the side hull plates 28 and are able to effectively blanket the lateral surfaces. This effect is illustrated in FIGS. 6A and 6B. When the side hull plates 28 are oriented at right angles to the bottom section as in FIG. 6A, even if the bubbles are injected into the turbulent boundary layer formed along the lateral surfaces, the bubbles 31 rise up by the inherent lift force of the bubbles and are removed from the layer and cannot be retained close to the surface of the side hull plates 28. However, when the side hull plates 28 are slanted outwards as shown in FIG. 6B (refer to $\alpha$2), the lift forces act on the bubbles 31 to force the bubbles to the side hull plates 28, thus enabling the lateral bubbles to effectively covering the surface of the side hull plates 28. The friction-reducing effect of the bubbles on the ship 1A is thereby increased.

In the above case, the slanting angle of the side hull plates 28 increases towards the stern of the ship 1A such that $\alpha$1<$\alpha$2<$\alpha$3, and the duration of the bubbles covering the side hull plates 28 is lengthened towards the stern, thereby further increasing the friction-reducing effects.

Features of the second embodiment are summarized as follows.

a. Micro-bubbles for reducing skin-friction of a ship are produced by compressed air jetting through gas jetting devices disposed in those locations of the ship that forces the flow lines near the bow of the ship to be directed towards the bottom and stern sections of the ship, and furthermore, the side hull plates in the mid-section of the ship are slanted outwards. This arrangement enables to force the lateral bubbles to press against the lateral surfaces due to their own lift force, thereby increasing the friction reduction effects and promoting efficient cruising ability of the ship.

b. The slanting angle is increased towards the stern section of the ship so that the duration of time for the bubbles to cover the hull surfaces is lengthened to further promote the friction reduction effects of jetting bubbles C: Third Embodiment A third embodiment will be presented with reference to FIGS. 7A,7B,8A,8B and FIG. 9.

Figure 7A:
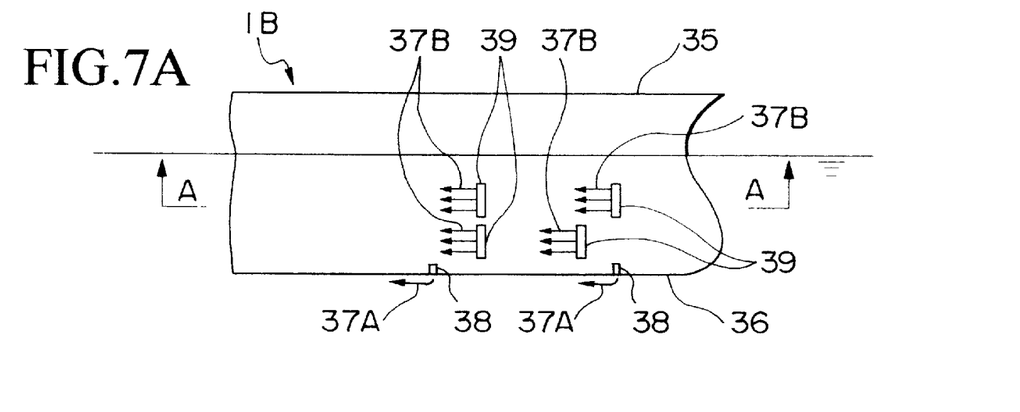
FIG. 7A is a schematic side view of the bow section of a ship in a third embodiment.
Figure 7B:
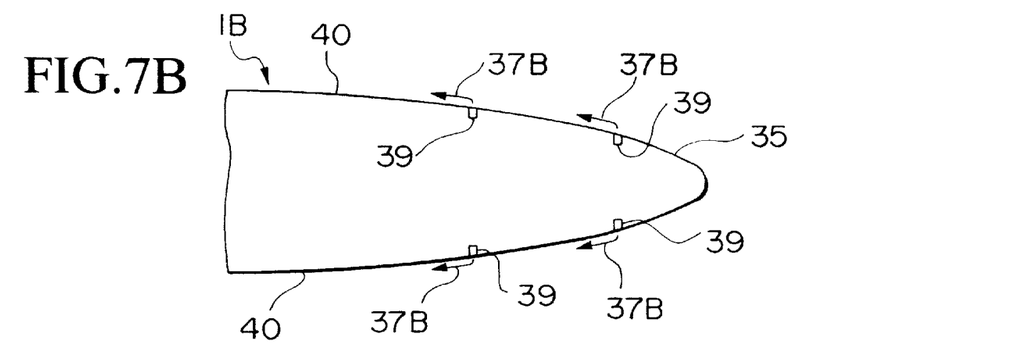
FIG. 7B is a cross sectional view through a plane A—A in FIG. 7A.

As shown in FIGS. 7A and 7B, the ship 1B is provided with an air jetting devices 38 in the bow section 35, disposed in a plurality of locations (two locations in the drawing) in the longitudinal direction, to produce bottom bubbles 37A in the bottom section 36 by blowing compressed air into the water. Also in the bow section 35, air jetting devices 39, disposed in a plurality of lateral locations (four locations on the starboard side 40 in the drawing) in the longitudinal direction, to produce smaller lateral bubbles 37B (500 μm, for example) than the bottom bubbles 37A. That is, the ship 1B in the third embodiment produces two types of bubbles, 37A and 37B depending on whether they are for the bottom section 36 or for the lateral sections 40.

Figures 8A, 8B:
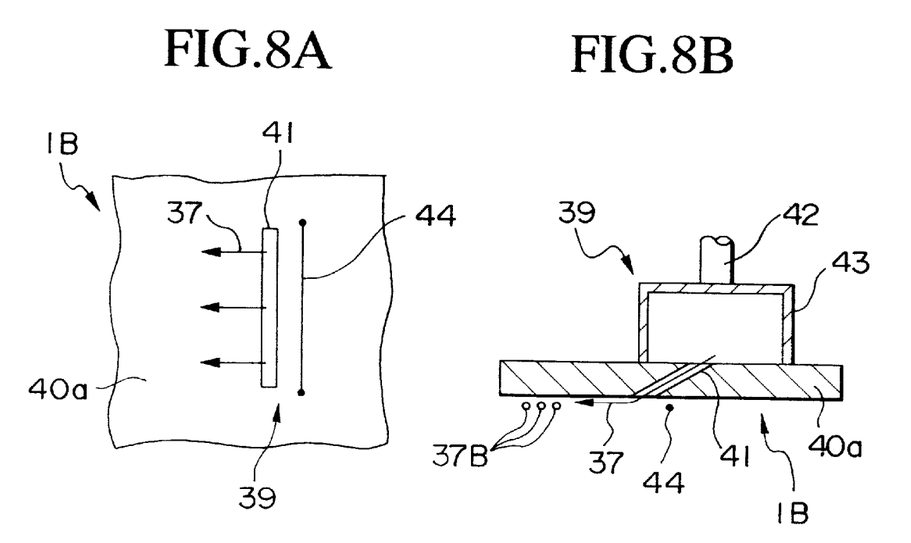
FIG. 8A is a side view of the air jetting devices provided on the lateral hull surfaces of a ship in a third embodiment.
FIG. 8B is a cross sectional top view of the air jetting device shown in FIG. 8A.

The air jetting devices 39 are constructed as shown in FIGS. 8A, 8B. The air jetting devices 39 are disposed on the side plate 40a, and the shape of the gas jet outlet 41 is made in the form of a slit so that compressed air 37 will be ejected at an angle towards the stern direction. The gas jet outlet 41 is located on the inside of a seachest housing 43 watertightly attached to the interior surface of the side plates 40a. In addition, a wire 44 is stretched across and away from the side plates 40a in an upstream location of the gas jet outlet 41 at a distance of 1~2 mm. The purpose of the wire 44 is to generate a micro-bubbles effectively when the ship 1B is moving so that the compressed air 37 jetting out of the gas jet outlet 41 will be smashed by the turbulent flow. The air jetting device 38 is similar to the air jetting device 39 but without the wire 44 and the angle of the slit is at right angles to the side plate 40a.

The friction-reduction in ship 1B is effected by blowing the compressed air 37 out of the air jetting devices 39 at a speed higher than the ship speed, and directing the jet towards the stern section at an angle to the side plate 40a. Also, the bubbles directed into the turbulent boundary layer are comprised by the lateral bubbles 37B, generated by the air jetting devices 39 on the hull plates 40a, which are smaller than the bottom bubbles 37A generated by the air jetting devices 38 in the bottom section 36. For example, the diameters of the lateral bubbles 37B may be about 500 μm.

One method for increasing the speed of the lateral bubbles 37B jetting into the turbulent boundary layer more than the ship speed is to adjust the pressure on the compressed air 37. Another method, without involving the wire 44, of obtaining the lateral bubbles 37B of small diameters is to adjust the gas flow rate through the jetting devices according to known Meng's formula.

When the ship 1B is cruising, the compressed air 37 is led to the air jetting devices 38 in the bottom section 36 and is blown through the gas jet outlet 41 into the water. The bottom bubbles 37A flow along the bottom section 36 towards the stern section. In the meantime, the compressed air 37 is led to the air jetting devices 39 oil the lateral section 40 and blown through the gas jet outlet 41, and the lateral bubbles 37B flow along the flow lines near the lateral section 40. In this condition, the entire surface of the submerged section of the ship 1B is covered with a layer comprised by the bottom bubbles 37A and the lateral bubbles 37B.

Figure 9:
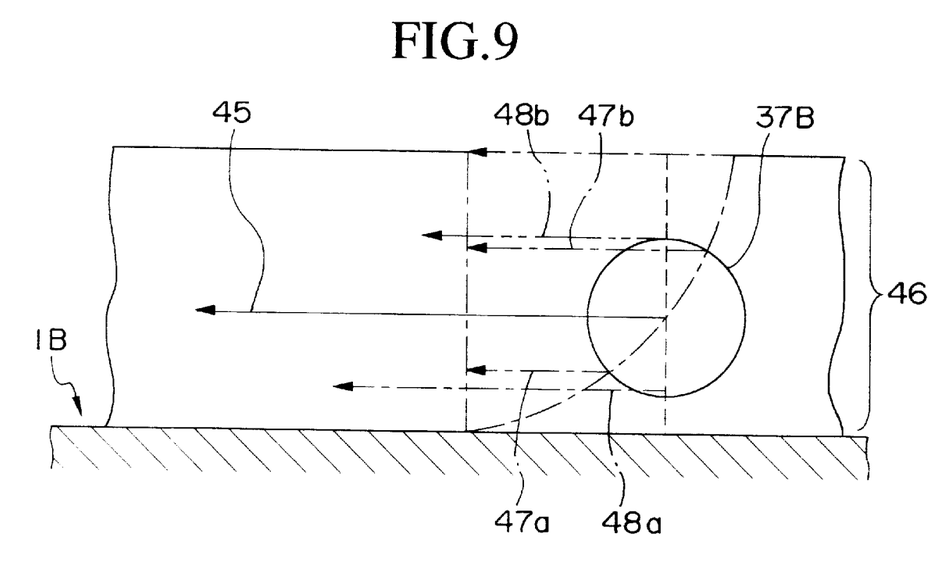
FIG. 9 is a schematic illustration of the principle of generation of lift forces acting on the micro-bubbles within the boundary layer.

Dynamics of the lateral bubbles 37B will be explained with reference to FIG. 9. Because the compressed air 37 is blown into the shear flow around the ship 1B at a speed higher than the ship speed and is directed the jet towards the stern section at an angle to the side plate 40a out of the air jetting devices 39, the relative speed 48a between the speed 47a of shear flow at the inside (close to the ship 1B) of turbulent boundary and the speed 45 of the lateral bubbles 37B is larger than the relative speed 48b between the speed 47b of shear flow at the outside (away from the ship 1B) of turbulent boundary and the speed 45 of the lateral bubbles 37B. Therefore, the lift force of the lateral bubbles 37B is affected by the difference in the relative speed 48a, 48b in such a way to attract the lateral bubble 37B towards the ship 1B.

Furthermore, the diameters of the lateral bubbles 37B are made to be smaller than that of the bottom bubbles 37A so that their effect on lift force is relatively small. Therefore, the dwell time for the lateral bubbles 37B on the lateral section 40 becomes longer compared to other friction-reducing ships not having such differences in diameters of bubbles in the two sections. Therefore, it is possible to increase the average void fraction in the boundary layer 46 on the lateral section 40, thereby increasing the friction-reducing effects compared to ships having a conventional friction-reducing facility.

Also, because the air jetting devices 39 are provided in the flow fields of the lateral section 40, the coverage area of the lateral bubbles 37B for the ship 1B can be enlarged.

It should be noted that the present invention is not limited to the cases presented above, and can be embodied in other modified forms as follows.

a. The shape of the gas jet outlet 41 on the lateral section 40 is not limited to a slit shape. Other shapes, such as fine holes, are permissible so long as the bubbles are ejected towards the stern section at an angle to the lateral section 40.

b. The positions of the air jetting devices 38, 39 are not limited to the bow section 35 so long as the blanketing action by the bubbles 37A, 37B can be achieved throughout the submerged section of the ship 1B.

c. It is also permissible to pre-mix air in water, and such bubbly mixture may be ejected from the gas jet outlet 41 to produce the bubbles 37B.

Features of the third embodiment are summarized as follows.

a. The basic conditions for generating bubbles are: that compressed air should be ejected at an angle towards the rear at a speed higher than the ship speed, and that the diameters of the bubbles in the lateral section should be made smaller than those in the bottom section. Under these conditions, when the relative speed vectors between the inner and outer shear speeds of each bubble in the lateral boundary layer are compared, the relative speed vector near the ship hull is larger than the relative speed vector away from the ship hull to cause the lateral bubbles to be attracted towards the hull. In this condition, the effect of lift on the lateral bubbles is diminished, and the dwell time of the lateral bubbles injected into the lateral boundary layer will be increased, thereby increasing the void fraction and the friction-reducing effects of the bubbles.

b. By locating the lateral gads jet outlets for compressed air in the longitudinal direction within the flow fields of the submerged section of a ship, blanketing area of the bubbles on the lateral surfaces can be enlarged.

c. Instead of blowing compressed air, a mixture of air and water may be used to generate similar friction-reducing effects.

What is claimed is:

1. A method for reducing skin-friction in a ship by blowing gas from a moving ship into water to generate bubbles on submerged surfaces in such a way that said bubbles are generated at locations separated at specific distances along a longitudinal direction, so as to trap more of the bubbles within the turbulent boundary layer formed over the surfaces of the ship due to the bubbles produced by succeeding locations become enclosed by the bubbles produced by longitudinally preceding locations.

2. A friction-reducing ship which reduces skin-friction by jetting gas from a moving ship into water to form bubbles on hull surfaces, comprising:

a plurality of gas jetting devices for blowing the gas into water, the jetting devices being disposed at specific distances along a longitudinal direction, so as to trap more of the bubbles within a turbulent boundary layer formed over the surfaces of the ship, the turbulent boundary layer being formed due to bubbles produced by succeeding letting devices becoming enclosed by bubbles produced by longitudinally preceding jetting devices; and a gas supply facility for supplying the gas to said gas jetting devices.

3. A friction-reducing ship for reducing skin-friction by generating bubbles by blowing compressed air into water at submerged lateral locations around a bow section where flow lines lead to a bottom section or a stern section, from the bow section of a moving ship, wherein side hull plates which are disposed in a longitudinal mid-section of said ship, extend to the water-line from the bottom section, and are slanted outwards at an angle to a plane vertical to said bottom section so as to trap more of the bubbles over the surfaces of the side hull plates because of the lift force acting on the bubbles to push the bubbles toward the surfaces of the side hull plates.

* * * * *

UNITED STATES PATENT AND TRADEMARK OFFICE
CERTIFICATE OF CORRECTION

PATENT NO. : 6,145,459
DATED : November 14, 2000
INVENTOR(S) : Takahashi et al.

Page 1 of 2

It is certified that error appears in the above-indentified patent and that said Letters Patent is hereby corrected as shown below:

Column 3, line 66, delete "plain" and insert --plan--.

Column 4, line 61, delete "atid" and insert --and--.

Column 5, line 8, delete "8A1~8B1" and insert --8A1--, 8B1---.

Column 5, line 65, delete "21$h$" and insert --21b--.

Column 6, line 4, delete "(8A2" and insert --8A2--.

Column 6, line 6, delete "(comprising" and insert --comprising--.

Column 8, line 36, delete "(a1," and insert --a1,--.

Column 9, line 67, delete "oil" and insert --on--.

UNITED STATES PATENT AND TRADEMARK OFFICE
CERTIFICATE OF CORRECTION

PATENT NO. : 6,145,459
DATED : November 14, 2000
INVENTOR(S) : Takahashi et al.

It is certified that error appears in the above-indentified patent and that said Letters Patent is hereby corrected as shown below:

Signed and Sealed this

Twenty-ninth Day of May, 2001

Attest:

NICHOLAS P. GODICI

Attesting Officer     Acting Director of the United States Patent and Trademark Office